US010387661B2

(12) United States Patent
Davis et al.

(10) Patent No.: US 10,387,661 B2
(45) Date of Patent: Aug. 20, 2019

(54) DATA REDUCTION WITH END-TO-END SECURITY

(71) Applicant: PURE STORAGE, INC., Mountain View, CA (US)

(72) Inventors: John D. Davis, San Francisco, CA (US); Jonas R. Irwin, Livermore, CA (US); Ethan L. Miller, Santa Cruz, CA (US)

(73) Assignee: Pure Storage, Inc., Mountain View, CA (US)

(*) Notice: Subject to any disclaimer, the term of this patent is extended or adjusted under 35 U.S.C. 154(b) by 217 days.

(21) Appl. No.: 15/402,195

(22) Filed: Jan. 9, 2017

(65) Prior Publication Data

US 2018/0196947 A1 Jul. 12, 2018

(51) Int. Cl.

| | |
|---|---|
| ***G06F 21/60*** | (2013.01) |
| ***G06F 21/62*** | (2013.01) |
| ***H04L 29/06*** | (2006.01) |

(52) U.S. Cl.
CPC ........ *G06F 21/602* (2013.01); *G06F 21/6218* (2013.01); *H04L 63/0428* (2013.01)

(58) Field of Classification Search
CPC . G06F 21/602; G06F 21/6218; H04L 63/0428
See application file for complete search history.

(56) References Cited

U.S. PATENT DOCUMENTS

| | | | |
|---|---|---|---|
| 6,286,056 B1 | 9/2001 | Edgar et al. | |
| 6,804,703 B1 | 10/2004 | Allen et al. | |
| 6,954,881 B1 | 10/2005 | Flynn, Jr. et al. | |
| 7,139,907 B2 | 11/2006 | Bakke et al. | |
| 7,272,674 B1 | 9/2007 | Nandi et al. | |
| 7,313,636 B2 | 12/2007 | Qi | |
| 7,577,802 B1 | 8/2009 | Parsons | |
| 8,103,754 B1 | 1/2012 | Luong et al. | |
| 8,301,811 B1 | 10/2012 | Wigmore et al. | |
| 8,645,649 B2 | 2/2014 | Kaiya et al. | |
| 8,655,702 B2 | 2/2014 | Ranjekar | |
| 8,776,237 B2 | 7/2014 | Grosse | |
| 9,063,937 B2 | 6/2015 | McDowell et al. | |
| 9,195,851 B1 * | 11/2015 | Chandra | H04L 9/0894 |

(Continued)

OTHER PUBLICATIONS

Int'l Search Report and Written Opinion of the ISA/EP in PCT/US2017/066725 dated Mar. 12, 2018; 10 pgs.

(Continued)

*Primary Examiner* — Ayoub Alata

(74) *Attorney, Agent, or Firm* — Womble Bond Dickinson (US) LLP; Daniel E. Ovanezian

(57) ABSTRACT

A storage controller coupled to a storage array comprising one or more storage devices receives a request to write encrypted data to a volume resident on a storage array, where the encrypted data comprises data encrypted by a first encryption key that is associated with at least one property of the data. The storage controller determines a decryption key to decrypt the encrypted data, decrypts the encrypted data using the decryption key, performs at least one data reduction operation on the decrypted data, encrypts the reduced data using a second encryption key to generate a second encrypted data, and storing the second encrypted data on the storage array.

20 Claims, 5 Drawing Sheets

(56) References Cited

U.S. PATENT DOCUMENTS

| | | | |
|---|---|---|---|
| 9,201,724 B2 | 12/2015 | Butt et al. | |
| 9,225,691 B1 * | 12/2015 | Balasubramanian | G06F 21/00 |
| 9,294,567 B2 | 3/2016 | Hussain et al. | |
| 9,430,412 B2 | 8/2016 | Huang | |
| 9,501,245 B2 | 11/2016 | Hussain et al. | |
| 9,565,269 B2 | 2/2017 | Malwankar et al. | |
| 2007/0094507 A1 * | 4/2007 | Rush | H04L 63/123<br>713/176 |
| 2008/0034167 A1 | 2/2008 | Sharma et al. | |
| 2008/0263356 A1 | 10/2008 | Overby | |
| 2010/0287262 A1 | 11/2010 | Elzur | |
| 2013/0055053 A1 | 2/2013 | Butt et al. | |
| 2013/0185796 A1 | 7/2013 | Awad et al. | |
| 2013/0250779 A1 | 9/2013 | Meloche et al. | |
| 2015/0009990 A1 | 1/2015 | Sung et al. | |
| 2015/0019798 A1 | 1/2015 | Huang | |
| 2017/0024166 A1 | 1/2017 | Singh et al. | |

OTHER PUBLICATIONS

Ouyang, J. et al. (Mar. 1-5, 2014) "SDF: Software-Defined Flash for Web-Scale Internet Storage Systems", ASPLOS 2014, 14 pages.
Zhang, J. et al. (2016) "Application-Aware and Software-Defined SSD Scheme for Tencent Large-Scale Storage System" 2016 IEEE 22nd International Conference on Parallel and Distributed Systems, 482-490.
"Open-Channel Solid State Drives NVMe Specification" (Apr. 2016), 24 pages.

* cited by examiner

DATA REDUCTION WITH END-TO-END SECURITY

BACKGROUND

As computer memory storage and data bandwidth increase, so does the amount and complexity of data that businesses manage daily. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality. Since distributed storage systems can include large amounts of sensitive information, data encryption may be used to protect the system from data breach, which can increase complexity and impact performance.

BRIEF DESCRIPTION OF THE DRAWINGS

The present disclosure is illustrated by way of example, and not by way of limitation, in the figures of the accompanying drawings.

DETAILED DESCRIPTION

Figure 1:
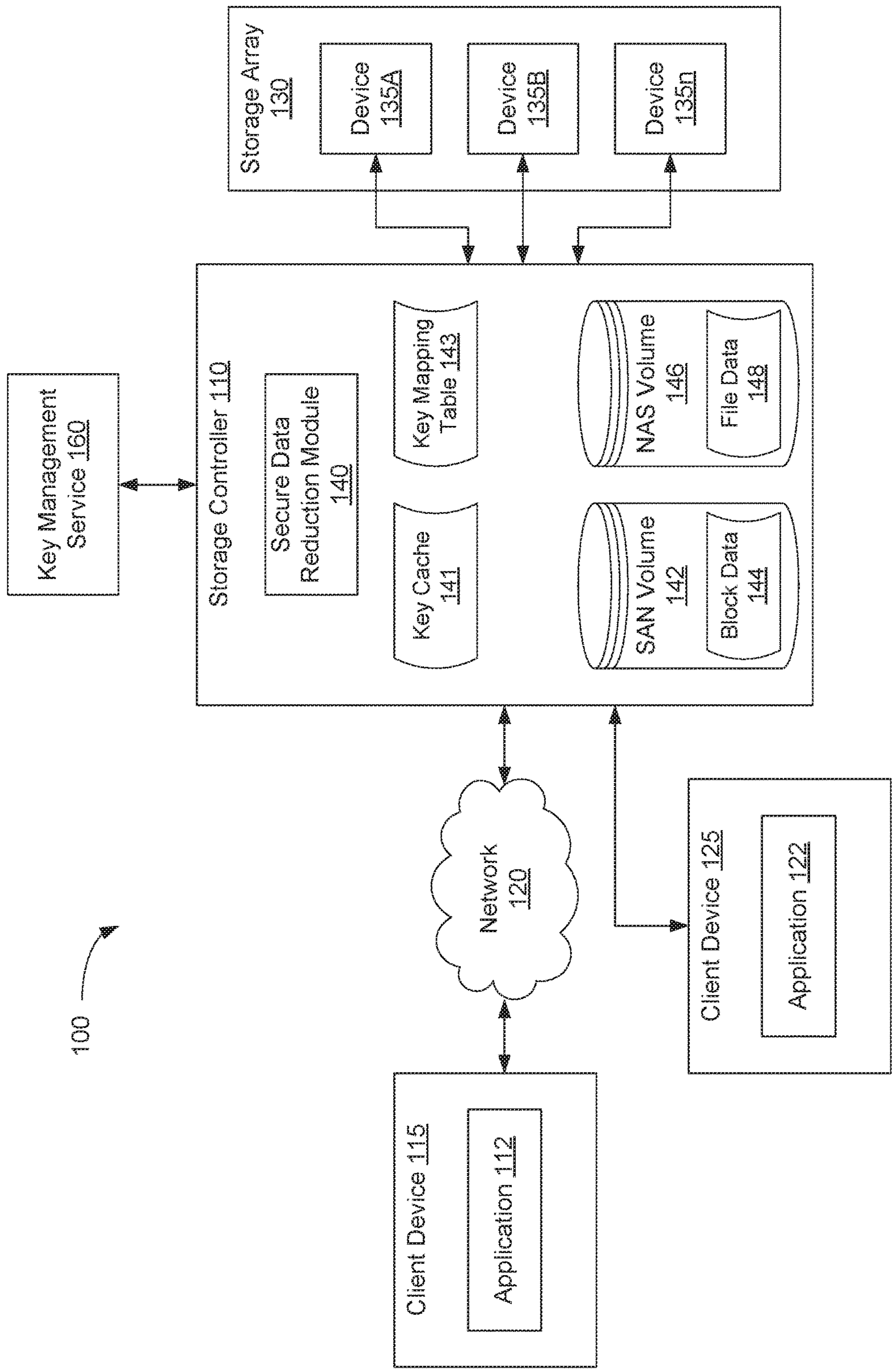
FIG. 1 is a block diagram illustrating a storage system in which embodiments of the present disclosure may be implemented.

Aspects of the present disclosure relate to providing data reduction with end-to-security. Many conventional distributed storage systems implement data encryption to prevent the negative impacts of data breach. Some implementations involve the use of "host-side" encryption, where a host machine (or client device, or client application, etc.) encrypts the data using an encryption key associated with the host and sends the encrypted data to the storage system. The encrypted data may then be stored in the storage system in its encrypted state, and only decrypted by the host (or client, or application) upon a subsequent read of the data. While this method can provide for secure data storage, it can lead to exponential growth in data storage needs since conventional data reduction methods may not be effective on data that has been encrypted. For example, many data reduction methods involve identifying commonly occurring portions of data within and between data files and storing those portions only once, yielding significant cost savings for data storage. Typical encryption methods generate data that appears random. Thus, the same content that is encrypted with different encryption keys may appear to be different, thereby reducing or eliminating the effectiveness of data reduction.

Aspects of the present disclosure address the above and other deficiencies by implementing data reduction in a storage system with end-to-end security. Host systems may provide decryption key information to the storage system that can be used to decrypt data to be written to the storage array. Upon receipt of a request to write the encrypted data to a storage array, the secure data reduction system may identify the appropriate decryption key for that data. The data may then be decrypted, and data reduction operations may subsequently be performed on the decrypted data. Once reduced, the data may then be encrypted for storage in the storage array using an encryption key that is associated with a property of the storage array. Thus, in various implementations, all data in the array can be encrypted using the same mode of encryption regardless of any encryption mode used by a client prior to sending the data, which can facilitate data reduction across the array while still providing secure data storage.

In an illustrative example, a storage controller coupled to a storage array comprising one or more storage devices can receive a request to write encrypted data to a volume resident on a storage array, where the encrypted data comprises data encrypted by a first encryption key that is associated with at least one property of the data. In some implementations, a property of the data may include a volume on the storage array where the data is stored, a volume range resident on the storage array, a group of blocks associated with the volume resident on the storage array, a unique identifier associated with the client (or owner of the data), a client application identifier, or any other similar information associated with the data. The storage controller determines a decryption key to decrypt the encrypted data, decrypts the encrypted data using the decryption key, and performs at least one data reduction operation (e.g., data compression, deduplication, etc.) on the decrypted data. The storage controller then encrypts the reduced data using a second encryption key to generate a second encrypted data and stores the second encrypted data on the storage array.

The storage controller may reverse the process in response to receiving a subsequent request to read the data from the storage array. The storage controller may decrypt the data using the decryption key associated with the array and perform data operations to reverse any data reduction performed during the process of storing the data (e.g., data "reduplication," "rehydration," or other similar operations to reconstitute the reduced data). The storage controller may then determine an encryption key associated with a property of the data and encrypt the data using that encryption key. A response to the read request may then be provided that includes the encrypted data.

FIG. 1 is a block diagram illustrating a storage system 100 in which embodiments of the present disclosure may be implemented. Storage system 100 may include storage controller 110 and storage array 130, which is representative of any number of data storage arrays or storage device groups. As shown, storage array 130 includes storage devices 135A-n, which are representative of any number and type of storage devices (e.g., solid-state drives (SSDs)). Storage controller 110 may be coupled directly to client device 125 and storage controller 110 may be coupled remotely over network 120 to client device 115. Client devices 115 and 125 are representative of any number of clients which may utilize storage controller 110 for storing and accessing data in storage system 100. It is noted that some systems may include only a single client device, connected directly or remotely, to storage controller 110.

Storage controller 110 may include software and/or hardware configured to provide access to storage devices 135A-n. Although storage controller 110 is shown as being separate from storage array 130, in some embodiments, storage controller 110 may be located within storage array 130. Storage controller 110 may include or be coupled to a base operating system (OS), a volume manager, and additional control logic, such as virtual copy logic 140, for implementing the various techniques disclosed herein.

Storage controller 110 may include and/or execute on any number of processing devices and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-n to prevent loss of data due to the failure of a device or the failure of storage locations within a device. Storage controller 110 may also utilize any of various data reduction technologies for reducing the amount of data stored in devices 135A-n by deduplicating common data (e.g., data deduplication, data compression, pattern removal, zero removal, or the like).

In one embodiment, storage controller 110 may utilize logical volumes and mediums to track client data that is stored in storage array 130. A medium is defined as a logical grouping of data, and each medium has an identifier with which to identify the logical grouping of data. A volume is a single accessible storage area with a single file system, or in other words, a logical grouping of data treated as a single "unit" by a host. In one embodiment, storage controller 110 stores storage volumes 142 and 146. In other embodiments, storage controller 110 may store any number of additional or different storage volumes. In one embodiment, storage volume 142 may be a SAN volume providing block-based storage. The SAN volume 142 may include block data 144 controlled by a server-based operating system, where each block can be controlled as an individual hard drive. Each block in block data 144 can be identified by a corresponding block number and can be individually formatted. In one embodiment, storage volume 146 may be a NAS volume providing file-based storage. The NAS volume 146 may include file data 148 organized according to an installed file system. The files in file data 148 can be identified by file names and can include multiple underlying blocks of data which are not individually accessible by the file system.

In one embodiment, storage volumes 142 and 146 may be logical organizations of data physically located on one or more of storage device 135A-n in storage array 130. The data associated with storage volumes 142 and 146 is stored on one or more locations on the storage devices 135A-n. A given request received by storage controller 110 may indicate at least a volume and block address or file name, and storage controller 110 may determine the one or more locations on storage devices 135A-n targeted by the given request.

In one embodiment, storage controller 110 includes secure data reduction module 140 to provide end-to-end secure data reduction. Secure data reduction module 140 may receive a request to write encrypted data to a logical volume (e.g., a SAN volume, a NAS volume, etc.) resident on storage array 130. In some implementations the request may be received from a client device such as client device 115 or 125. The encrypted data may be made up of data that is encrypted by the client device 115, 125 using an encryption key associated with at least one property of the data. In some implementations, the encryption key may be associated with at least one of the volume resident on the storage array, a logical volume range resident on the storage array, a group of blocks associated with the volume resident on the storage array, a client identifier, a client application identifier, or any other similar information associated with the data.

In response to receiving the request, secure data reduction module 140 may determine a decryption key to decrypt the encrypted data. The decryption key may be associated with the same property (or properties) of the data as is the encryption key. For example, the data may have been encrypted with a private key of a key pair and the decryption key may be the public key of the key pair, both of which are associated with the same property of the data. In some implementations, data reduction module 140 may determine the decryption key by accessing key mapping table 143 that maps encryption and decryption key information to properties of the data stored (or to be stored) in storage array 130. Alternatively, data reduction module 140 may communicate with a key management service 160 to determine the decryption key. In one embodiment, key management service 160 may be a component of the storage system that connects directly to storage controller 110. In another embodiment, storage key management service 160 may be external to the storage system 100, connected via network 120. Once the decryption key has been determined, it can be stored in key cache 141 for use with subsequent requests that include encrypted data associated with the same properties. Thus, in some implementations, repeated determinations of the same decryption key can be avoided by accessing the key cache 141.

Secure data reduction module 140 may then decrypt the encrypted data using the decryption key. Once the data has been decrypted, secure data reduction module 140 may then perform at least one data reduction operation on the decrypted data. For example, a data deduplication operation may be performed to remove duplicated portions of the data. Additionally or alternatively, a data compression operation may be performed to compress the data.

Once the data has been reduced, secure data reduction module 140 may encrypt the reduced data using an encryption key associated with a property of the storage array 130. Notably, the key used to encrypt the data prior to storing in the array can be for a different key pair than that used to encrypt the data by the client. In other words, the data received by secure data reduction module 140 from the client could be encrypted with one key while secure data reduction module 140 could use an entirely different key to encrypt the reduced data prior to storing in storage array 130. In some implementations, all data stored in the storage array may be encrypted using the same encryption key. Alternatively, policies may be implemented to encrypt different portions of the storage array using different keys. For example, encryption keys may be assigned based on volume, a specific grouping of volumes, client identifier, tenant identifier (for a multi-tenant storage system), or the like. Once encrypted for storage, secure data reduction module 140 may then store the encrypted data on the storage array 130.

Secure data reduction module 140 may then associate the stored data with the logical volume (e.g., the SAN volume 142, NAS volume 146, etc.) specified by the write request received from the client device 115, 125. In some implementations, secure data reduction module 140 may maintain this association in mapping tables that map a logical volume to one or more physical volumes of storage array 130.

In some implementations, secure data reduction module 140 may process read requests received from a client device 115, 125 by reversing the steps used to process a write request. Upon receiving a request to read encrypted data from a logical volume of the storage array, secure data reduction module 140 may decrypt the encrypted data using the encryption key associated with the property of the storage array as described above. In some implementations, secure data reduction module 140 may perform at least one of a data operation to reconstitute the deduplicated data (e.g., data "reduplication," data "rehydration," etc.) or data decompression operation to reverse the modifications made to the data by the data reduction operation performed when writing the data to the storage array.

Subsequently, secure data reduction module 140 may encrypt the reconstituted data using the encryption key associated with the properties of the data as described above. Secure data reduction module 140 may determine the encryption key to be used to encrypt the data by accessing the key cache 141, using the information in key mapping table 143, communicating with key management service 160, or in any other manner. Once the data has been encrypted secure data reduction module 140 may then provide a response to the read request by sending the encrypted data to the requesting client device 115, 125.

In various embodiments, multiple mapping tables may be maintained by storage controller 110. These mapping tables may include a medium mapping table and a volume to medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the client devices 115 and 125 to physical locations in storage devices 135A-n.

In alternative embodiments, the number and type of client computers, initiator devices, storage controllers, networks, storage arrays, and data storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, Infiniband, NVMe-F, PCIe and any new emerging storage interconnects may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the devices 135A-n appear to the initiator devices 115 and 125 as locally attached storage.

Client devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, client device 115 includes application 112 and client device 125 includes application 122. Applications 112 and 122 may be any computer application programs designed to utilize the data from block data 144 or file data 148 in storage volumes 142 and 146 to implement or provide various functionalities. Applications 112 and 122 may issue requests to read data from or write data to volumes 142 and 146 within storage system 100. For example, as noted above, the request may be to write encrypted data to or read encrypted data from a logical volume (e.g., SAN volume 142 or NAS volume 146).

In some implementations, prior to sending a request to write encrypted data, applications 112, 122 may first encrypt the data using an encryption key associated with a property of the data as described above. The applications 112, 122 may select the encryption key by accessing information stored locally on the applicable client device 115, 125. Alternatively, the applications 112, 122 may communicate to the key management service 160 to select the proper encryption key for the data. Similarly, upon receiving encrypted data in response to a read request, applications 112, 122 may use these methods to identify and select the decryption key to decrypt the encrypted data received in response to the request. In other implementations, the encryption of data for write request and decryption of data received for read requests may be performed by another component of the storage system between the client devices 115, 125 and storage controller 110 (e.g., by a network firewall device, a dedicated device to execute the encryption/decryption, etc.).

In response to the read or write requests, secure data reduction module 140 may use the techniques described herein to perform end-to-end secure data reduction operations on data in the storage system. Thus, the benefits of stronger security through encryption of the data objects may be maintained while additionally implementing the benefits of data reduction prior to storing in the storage array. Moreover, by decrypting the data upon receipt from a client and performing data reduction on the decrypted data, the benefits of data reduction may be realized across multiple tenants in a multi-tenant implementation.

Figure 2:
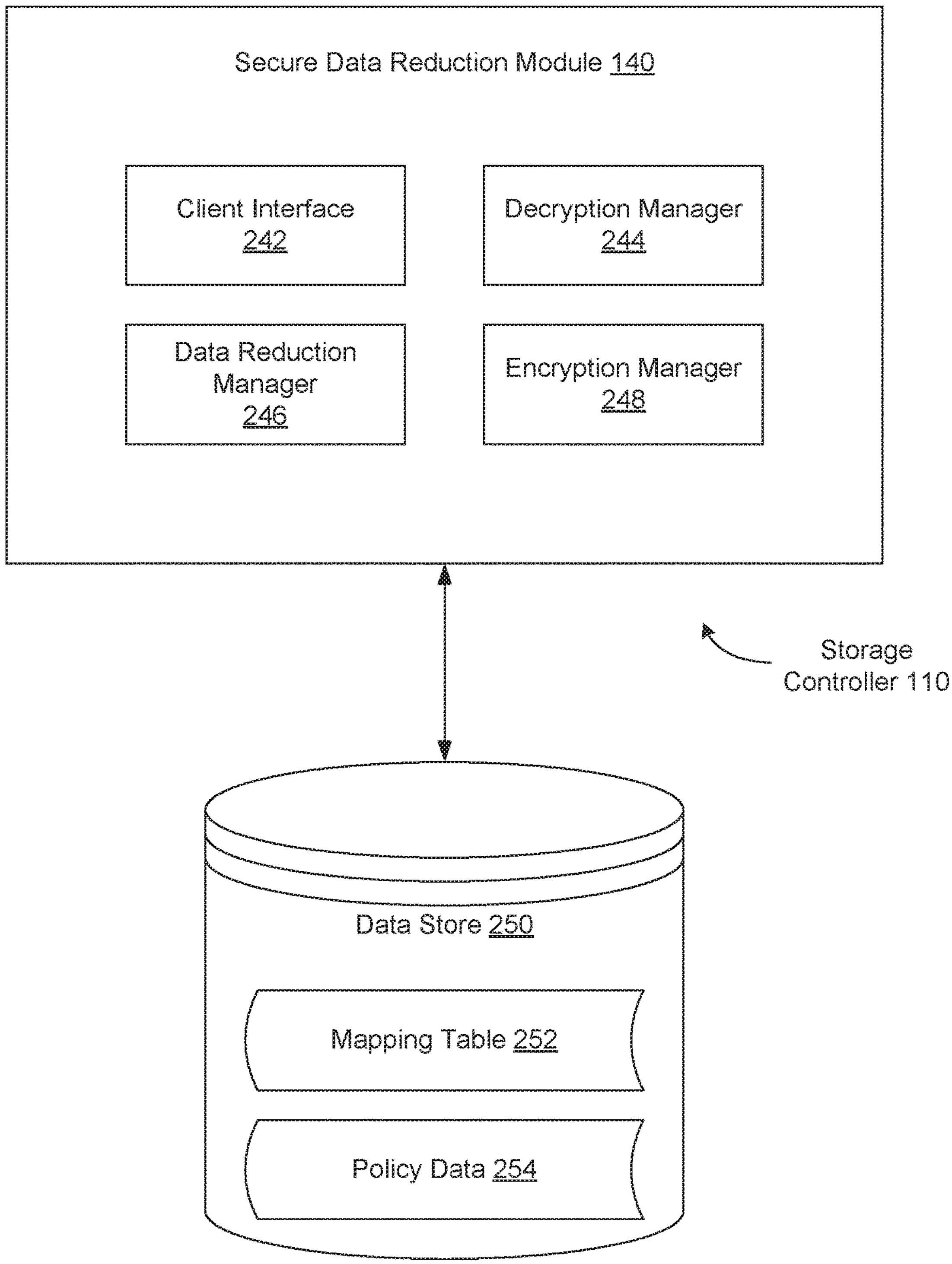
FIG. 2 is a block diagram illustrating secure data reduction with end-to-end security in a storage controller, according to an embodiment.

FIG. 2 is a block diagram illustrating secure data reduction module 140 in a storage controller 110, according to an embodiment. In one embodiment, secure data reduction module 140 includes client interface 242, decryption manager 244, data reduction manager 246, and encryption manager 248. This arrangement of modules may be a logical separation, and in other embodiments, these modules, interfaces or other components can be combined together or separated in further components. In one embodiment, data store 250 is connected to secure data reduction module 140 and includes mapping table 252 and policy data 254. In another embodiment, mapping table 252 and policy data 254 may be located elsewhere. For example, mapping table 252 and policy data 254 may be stored in a different volume managed by storage controller 110 or may be stored in a memory of the storage controller 110.

In one embodiment, storage controller 110 may include secure data reduction module 140 and data store 250. In another embodiment, data store 250 may be external to storage controller 110 and may be connected to storage controller 110 over a network or other connection. In other embodiments, storage controller 110 may include different and/or additional components which are not shown to simplify the description. Data store 250 may include one or more mass storage devices which can include, for example, flash memory, magnetic or optical disks, or tape drives; read-only memory (ROM); random-access memory (RAM); 3D XPoint, erasable programmable memory (e.g., EPROM and EEPROM); flash memory; or any other type of storage medium.

In one embodiment, client interface 242 manages communication with client devices in storage system 100, such as client devices 115 or 125. Client interface 242 can receive I/O requests to access data storage volumes 142 and 146 from an application 112 or 122 over network 120. In one embodiment, the I/O request includes a request to write encrypted data to a logical volume resident on storage array 130 (e.g., SAN volume 142, NAS volume 146, etc.). As noted above, the encrypted data may be made up of data that is encrypted by the client devices 115 or 125 using an encryption key associated with at least one property of the data. In some implementations, the encryption key may be associated with at least one of the volume resident on the storage array, a logical volume range resident on the storage array, a group of blocks associated with the volume resident on the storage array, a client identifier, a client application identifier, or any other similar information associated with the data. The request may include the encrypted data and the location to which the data should be stored (e.g., the volume, group of volumes, group of blocks, etc.) In some implementations, the request may include additional data to identify the data such as a client identifier identifying the client that submitted the request), a host identifier (identifying the host that submitted the request), an application identifier (identifying the application that submitted the request), or other similar information.

In response to receiving the request, decryption manager 244 may be invoked to decrypt the encrypted data. Decryption manager 244 may determine the decryption key to decrypt the data. The decryption key may be associated with the same property (or properties) of the data as is the encryption key used to encrypt the data. For example, the data may have been encrypted with a private key of a key pair and the decryption key may be the public key of the key pair, both of which are associated with the same property of the data.

In one embodiment, decryption manager 244 may determine the decryption key by determining a security identifier associated with the property (or properties) of the data. In some implementations, decryption manager 244 may determine the security identifier by accessing a mapping table (e.g., mapping table 242) accessible to storage controller 110. The mapping table may map a security identifier to a combination of one or more properties of data stored in storage array 130. For example, one security identifier may be assigned to a particular host identifier. Another security identifier may be assigned to a range of volumes for a host identifier. Thus, different hosts (or clients, applications, etc.) may have different security identifiers. Similarly, a single host (or client, application, etc.) may have multiple security identifiers.

In some implementations, a single host (or client, application, etc.) may have conflicting security identifiers in mapping table 242. For example, Host1 may have one security identifier assigned to volumes 1-100 in the storage system, and a second security identifier assigned to only volumes 1-10. In such cases, decryption manager 244 may determine the appropriate security identifier for the request by accessing predefined policies for the storage system. The policies may be stored in policy data 254, and implemented to resolve conflicting security identifier assignments. For example, a policy for Host1 could indicate that when conflicting security identifiers are found, the most granular definition should be used. Thus, in the example above, the second security identifier could be selected (e.g., for volumes 1-10). Alternatively, the least granular definition might be used, resulting in the selection of the first security identifier (e.g., for volumes 1-100).

Once the security identifier has been determined, decryption manager 244 may determine the decryption key. In one embodiment, decryption manager 244 may access a mapping table that stores a mapping between the security identifier and the decryption key. This mapping table may be stored locally to storage controller 110, or in another location within the storage system 100. The mapping table may be stored in mapping table 252 with the security identifier mapping information, or in a separate key mapping table (e.g., key mapping table 143 of FIG. 1). In another embodiment, decryption manager 244 may identify the decryption key by accessing a key cache (e.g., key cache 141 of FIG. 1) where key information for previously processed write requests are stored within the memory of storage controller 110. In some implementations, where the decryption key in the key cache has expired or results in an invalid decryption operation, decryption manager 244 may determine a new decryption key according to the above process.

In another embodiment, decryption manager 244 may determine the decryption key by communicating with a key management service (e.g., key management service 160 of FIG. 1). Decryption manager 244 may send the security identifier in a request to the key management service, and receive a response with the decryption key information. In another embodiment, decryption manager 244 may determine the decryption key by detecting a physical device attached to an input port associated with the storage array and receiving the decryption key from the physical device. For example, a universal serial bus (USB) device that includes the decryption key may be inserted into a USB port of the storage array. Decryption manager 244 may then receive the decryption key from the USB device.

Once the decryption key has been determined, decryption manager 244 may store it in the key cache (e.g., key cache 141) for use with subsequent requests that include encrypted data associated with the same properties. Thus, repeated determinations of the same decryption key can be avoided by accessing the key cache. Decryption manager 244 may then decrypt the encrypted data using the decryption key.

Data reduction manager 246 may then be invoked to perform at least one data reduction operation on the decrypted data. For example, a data deduplication operation may be performed to remove duplicated portions of the data. Additionally or alternatively, a data compression operation may be performed to compress the data. In some implementations where data is stored in storage array 130 for multiple clients (e.g., in a multi-tenant system), the data reduction operation may be performed to achieve data reduction across all clients (e.g., all tenants). The data deduplication and/or data compression operations may be performed using any conventional method.

Encryption manager 248 may then be invoked to encrypt the reduced data to generate encrypted data for the storage array. In some implementations, encryption manager 248 may use an encryption key associated with at least one property of the storage array. As noted above, the key used to encrypt the data prior to storing in the storage array can be for a different key pair than that used to encrypt the data by the client. In other words, the data received from the client could be encrypted with one key while encryption manager 248 could use an entirely different key to encrypt the reduced data prior to storing in the storage array. In some implementations, all data stored in the storage array may be encrypted using the same encryption key. Alternatively, policies may be implemented (and stored in policy data 254) to encrypt different portions of the storage array using different keys. For example, encryption keys may be assigned based on volume, client identifier, tenant identifier (for a multi-tenant storage system), or the like. Once encrypted for storage, secure data reduction module 140 may then store the encrypted data on the storage array.

In one embodiment, client interface 242 can receive an I/O request that includes a request to read encrypted data from a logical volume resident on storage array 130 (e.g., SAN volume 142, NAS volume 146, etc.). Upon receiving a request to read encrypted data from a logical volume of the storage array, decryption manager 244 may be invoked to decrypt the encrypted data using an encryption key associated with the property of the storage array as described above. Data reduction manager 246 may then be invoked to perform at least one data operation to reverse any data reduction performed during the process of storing the data. For example, data reduction manager 246 may perform at least one of a data operation to reconstitute the deduplicated data (e.g., a reduplication operation, a rehydration operation, or the like) or data decompression operation to reverse the modifications made to the data by the data reduction operation performed when writing the data to the storage array.

Encryption manager 248 may then be invoked to determine the encryption key associated with the property of the data. In embodiments, encryption manager 248 may use any of the methods of determining the encryption key as described above. For example, encryption manager 248 may access a local key cache (e.g., key cache 141 of FIG. 1), access a key mapping table (e.g., mapping table 252, or key mapping table 143 of FIG. 1), communicate with a key management service, receive the encryption key from a physical device connected to an input port of the storage system, or in any other manner. Encryption manager 248 may then encrypt the reconstituted data using the determined encryption key. Once the data has been encrypted, client interface 242 may then provide a response to the read request by sending the encrypted data to the requesting client device 115, 125.

Figure 3:
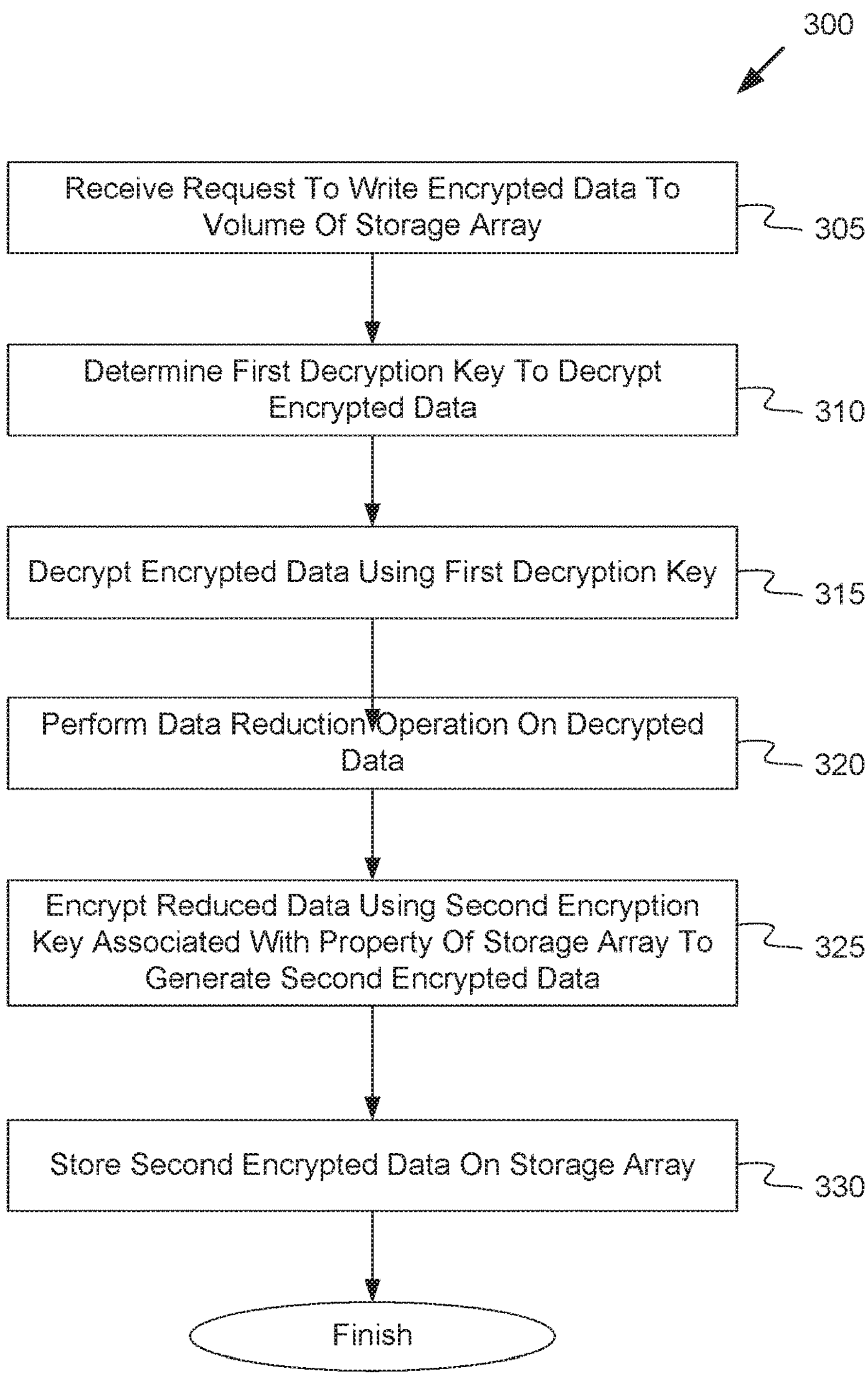
FIG. 3 is a flow diagram illustrating a method for end-to-end secure data reduction for write requests to a storage array, according to an embodiment.

FIG. 3 is a flow diagram illustrating a method 300 for end-to-end secure data reduction for write requests to a storage array, according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 300 may be performed by secure data reduction module 140, as shown in FIGS. 1 and 2.

Referring to FIG. 3, at block 305 of method 300, processing logic receives a request to write encrypted data to a volume resident on a storage array. In some implementations the volume may be a logical volume (e.g., a SAN volume, a NAS volume, etc.). In some implementations, the encrypted data includes data that has been encrypted by an encryption key associated with at least one property of the data. For example, the encryption key may be associated with at least one of the volume resident on the storage array, a logical volume rage resident on the storage array associated with the client that writes the data, a group of blocks associated with the volume resident on the storage array, a client identifier, a client application identifier, or other similar information.

At block 310, processing logic determines a decryption key to decrypt the encrypted data, where the decryption key is associated with the at least one property of the data. At block 315, processing logic decrypts the encrypted data using the decryption key determined at block 310 to generate decrypted data. At block 320, processing logic performs at least one data reduction operation on the decrypted data from block 315 to generated reduced data. For example, processing logic may perform a data de-duplication operation on the decrypted data. Additionally or alternatively, processing logic may perform a data compression operation on the decrypted data.

At block 325, processing logic encrypts the reduced data using an encryption key associated with at least one property of the storage array to generate new encrypted data to be stored on the storage array. At block 330, processing logic stores the encrypted data from block 325 on the storage array. After block 330, the method of FIG. 3 terminates.

Figure 4:
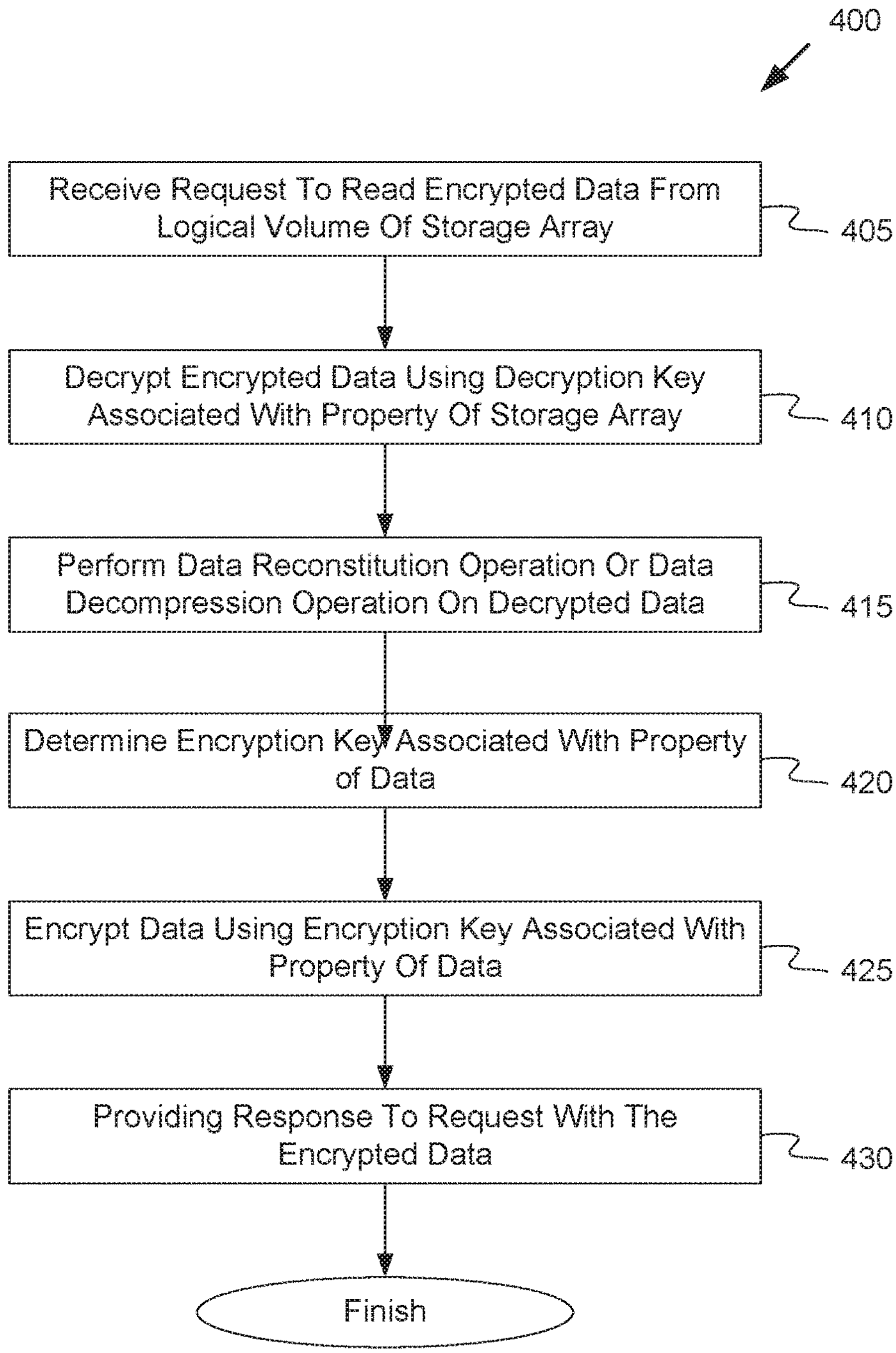
FIG. 4 is a flow diagram illustrating a method for end-to-end secure data reduction for read requests for a storage array, according to an embodiment.

FIG. 4 is a flow diagram illustrating a method 400 for end-to-end secure data reduction for read requests from a storage array, according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 may be performed by secure data reduction module 140, as shown in FIGS. 1 and 2.

Referring to FIG. 4, at block 405 of method 400, processing logic receives a request to read encrypted data from a logical volume of a storage array. At block 410, processing logic decrypts the encrypted data using a decryption key associated with at least one property of the storage array. At block 415, processing logic performs at least one of a data operation to reconstitute the deduplicated data (e.g., a data reduplication operation, a data rehydration operation, etc.) or a data decompression operation on the decrypted data from block 410. At block 420, processing logic determines an encryption key associated with at least one property of the data. At block 425, processing logic encrypts the data from block 420 using an encryption key associated with at least one property of the data to generate new encrypted data. At block 430, processing logic provides a response to the request that includes the new encrypted data from block 425. After block 430, the method of FIG. 4 terminates.

Figure 5:
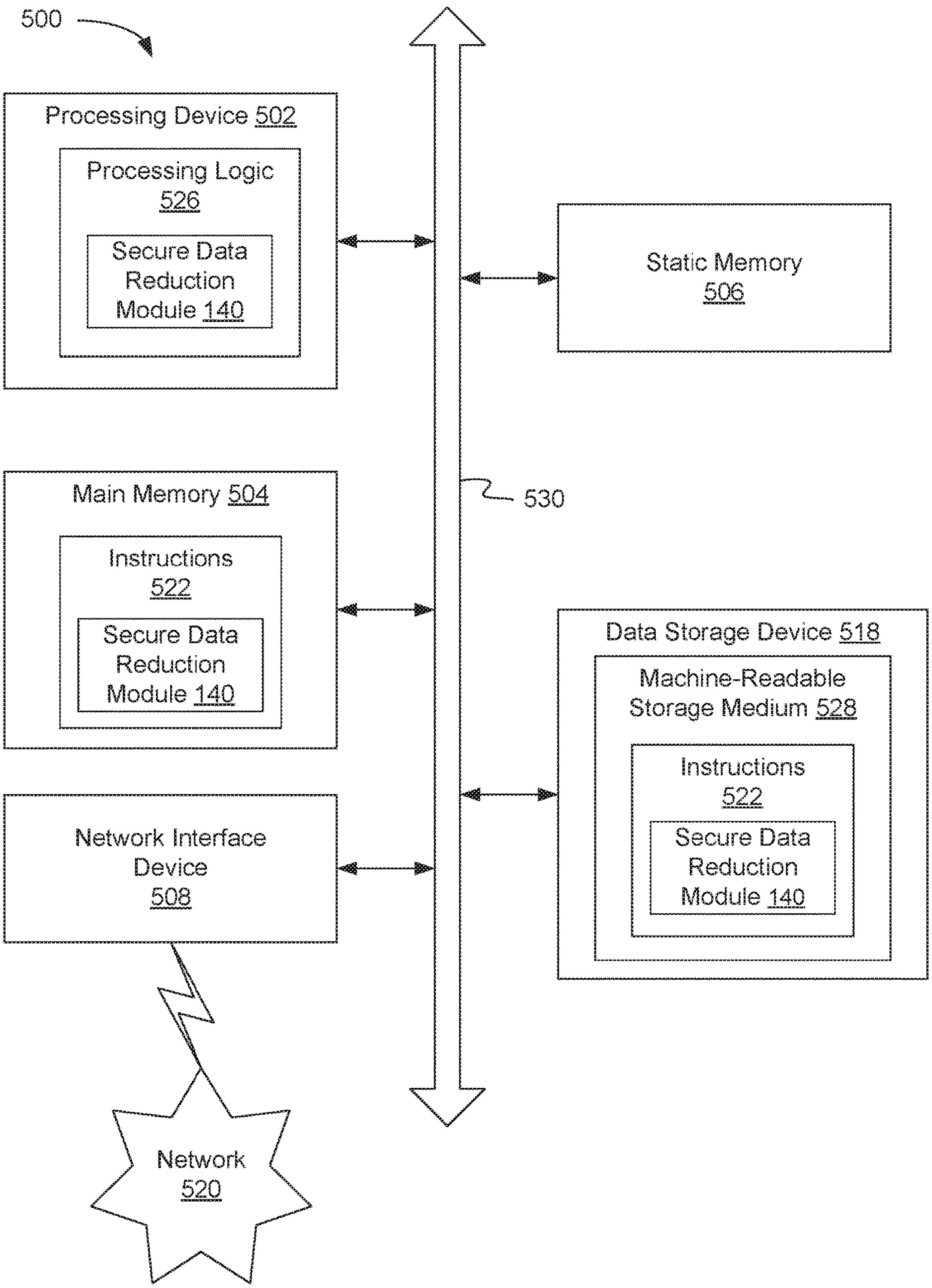
FIG. 5 is a block diagram illustrating an exemplary computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as storage controller 110 running secure data reduction module 140 or of a client, such as client devices 115 or 125.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Data storage device 518 may be one example of any of the storage devices 135A-n in FIG. 1 or of data store 250 in FIG. 2. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of secure data reduction module 140 shown in FIGS. 1 and 2, or of application 112 or 122, for performing the operations and steps discussed herein.

The data storage device 518 may include a machine-readable storage medium 728, on which is stored one or more set of instructions 522 (e.g., software) embodying any one or more of the methodologies of functions described herein, including instructions to cause the processing device 502 to execute secure data reduction module 140 or application 112 or 122. The instructions 522 may also reside, completely or at least partially, within the main memory 504 and/or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for data refresh in a distributed storage system without corruption of application state, as described herein. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Unless specifically stated otherwise, as apparent from the following discussion, it is appreciated that throughout the description, discussions utilizing terms such as "receiving," "determining," "decrypting," "performing," "encrypting," "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A system comprising a storage array comprising one or more storage devices: and a storage controller coupled to the storage array, the storage controller comprising a processing device, wherein the processing device comprising one or more processor cores to: receive a first request from a first client device to write a first encrypted data to a logical volume resident on the storage array, wherein the first encrypted data comprises a first data encrypted by a first encryption key, wherein the first encryption key is a private key and is associated with at least one of the logical volume, a logical volume range on the storage array, or a client identifier associated with the first data; determine a first decryption key to decrypt the encrypted data, wherein the first decryption key is a public key and is associated with the at least one of the logical volume, the logical volume range on the storage array, the client identifier associated with the first data, or the first encryption key; decrypt the encrypted data using the first decryption key to generate a first decrypted data; perform at least one of a data deduplication operation or a data compression operation on the first decrypted data to generate a first reduced data; encrypt the first reduced data using a second encryption key to generate a second encrypted data, wherein the second encryption key is associated with at least one property of the storage array; and store the second encrypted data on the storage array.

2. The system of claim 1, wherein to determine the first decryption key, the one or more processor cores are to: determine a security identifier associated with the at least one of the logical volume, the logical volume range on the storage array, or the client identifier associated with the first data; and access a mapping table that stores a mapping between the security identifier and the first decryption key.

3. The system of claim 1, wherein to determine the first decryption key, the one or more processor cores are to: determine a security identifier associated with the at least one of the first logical volume, the logical volume range on the storage array, or the client identifier associated with the first data; send a second request to a key management service for the first decryption key, the second request comprising the security identifier; and receive a response with the first decryption key.

4. The system of claim 1, wherein to determine the first decryption key, the one or more processor cores are to: detect a physical device on an input port associated with the storage array: and receive the first decryption key from the physical device.

5. The system of claim 1, wherein the one or more processor cores are further to: receive a second request from a second client device to read the second encrypted data from the logical volume on the storage array; decrypt the second encrypted data using a second decryption key to generate a second decrypted data, wherein the second decryption key is associated with the second encryption key; perform at least one of a data reconstitution operation or a data decompression operation on the second decrypted data; encrypt the second decrypted data using the first encryption key to generate a third encrypted data: and provide the third encrypted data to the second client device.

6. A method comprising: receiving a first request to write a first encrypted data to a volume resident on a storage array, wherein the first encrypted data comprises a first data encrypted by a first encryption key, wherein the first encryption key is a private key and that is associated with at least one property of the first data; determining a first decryption key to decrypt the encrypted data, wherein the first decryption key is a public key and is associated with the at least one property of the first data; decrypting the encrypted data using the first decryption key to generate a first decrypted data; performing at least one data reduction operation on the first decrypted data to generate a first reduced data; encrypting the first reduced data using a second encryption key to generate a second encrypted data: and storing the second encrypted data on the storage array.

7. The method of claim 6, wherein the at least one property of the first data comprises at least one of the volume resident on the storage array, a logical volume rage resident on the storage array, a group of blocks associated with the volume resident on the storage array, a client identifier, or a client application identifier.

8. The method of claim 6, wherein determining the first decryption key comprises: determining a security identifier associated with the at least one property of the first data; and accessing a mapping table that stores a mapping between the security identifier and the first decryption key.

9. The method of claim 6, wherein determining the first decryption key comprises: determining a security identifier associated with the at least one property of the first data; sending a second request to a key management service for the first decryption key, the second request comprising the security identifier: and receiving a response with the first decryption key.

10. The method of claim 6, wherein determining the first decryption key comprises: identifying a plurality of security identifiers associated with the at least one property of the first data: accessing a policy definition mapping associated with the first data; selecting a first security identifier of the plurality of security identifiers based on the policy definition mapping; and determining the first decryption key using the first security identifier.

11. The method of claim 6, wherein determining the first decryption key comprises: detecting a physical device on an input port associated with the storage array: and receiving the first decryption key from the physical device.

12. The method of claim 6, wherein the at least one data reduction operation comprises at least one of a data deduplication operation or a data compression operation.

13. The method of claim 6, wherein the second encryption key is associated with at least one property of the storage array.

14. The method of claim 6, further comprising: receiving a second request to read the second encrypted data from the volume on the storage array: decrypting the second encrypted data using a second decryption key to generate a second decrypted data, wherein the second decryption key is associated with the second encryption key; encrypting the second decrypted data using the first encryption key to generate a third encrypted data; and providing a response to the request, the response comprising the third encrypted data.

15. The method of claim 14, further comprising: performing at least one of a data reconstitution operation or a data decompression operation on the second decrypted data.

16. A non-transitory computer readable storage medium storing instructions, which when executed, cause a processing device to: receive a first request from a first client device to write a first encrypted data to a volume resident on a storage array, wherein the first encrypted data comprises a first data encrypted by a first encryption key that is a private key and that is associated with at least one property of the first data; determine a first decryption key to decrypt the encrypted data, wherein the first decryption key is a public key and is associated with the at least one property of the first data: decrypt the encrypted data using the first decryption key to generate a first decrypted data; perform at least one of a data deduplication operation or a data compression operation on the first decrypted data to generate a first reduced data: encrypt the first reduced data using a second encryption key to generate a second encrypted data, wherein the second encryption key is associated with at least one property of the storage array; and store the second encrypted data on the storage array.

17. The non-transitory computer readable storage medium of claim 16, wherein the at least one property of the first data comprises at least one of the volume resident on the storage array, a logical volume rage resident on the storage array, a group of blocks associated with the volume resident on the storage array, a client identifier, or a client application identifier.

18. The non-transitory computer readable storage medium of claim 16, wherein to determine the first decryption key, the processing device is to: identify a plurality of security identifiers associated with the at least one property of the first data; access a policy definition mapping associated with the first data; select a first security identifier of the plurality of security identifiers based on the policy definition mapping: and determine the first decryption key using the first security identifier by accessing at least one of a mapping table or a key management service.

19. The non-transitory computer readable storage medium of claim 16, wherein the processing device is further to: receive a second request to read the second encrypted data from the volume on the storage array; decrypt the second encrypted data using a second decryption key to generate a second decrypted data, wherein the second decryption key is associated with the second encryption key; encrypt the second decrypted data using the first encryption key to generate a third encrypted data: and provide a response to the request, the response comprising the third encrypted data.

20. The non-transitory computer readable storage medium of claim 19, wherein the processing device is further to: perform at least one of a data reconstitution operation or a data decompression operation on the second decrypted data.

* * * * *